United States Patent
Zhang et al.

(10) Patent No.: US 8,855,228 B2
(45) Date of Patent: *Oct. 7, 2014

(54) CALIBRATION CORRECTION FOR IMPLICIT BEAMFORMING IN A WIRELESS MIMO COMMUNICATION SYSTEM

(71) Applicant: Marvell World Trade Ltd., St. Michael (BB)

(72) Inventors: Hongyuan Zhang, Fremont, CA (US); Rohit U. Nabar, Sunnyvale, CA (US); Kedar Shirali, San Jose, CA (US); Peter Loc, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,393

(22) Filed: Mar. 4, 2013

(65) Prior Publication Data
US 2013/0177051 A1     Jul. 11, 2013

Related U.S. Application Data

(63) Continuation of application No. 13/178,387, filed on Jul. 7, 2011, now Pat. No. 8,391,397, which is a continuation of application No. 12/785,234, filed on May 21, 2010, now Pat. No. 7,978,781, which is a continuation of application No. 11/857,297, filed on Sep. 18, 2007, now Pat. No. 7,729,439.

(60) Provisional application No. 60/845,589, filed on Sep. 18, 2006.

(51) Int. Cl.
*H04B 7/02* (2006.01)
*H04B 1/40* (2006.01)

(52) U.S. Cl.
USPC ............... 375/267; 455/24; 455/69; 455/88

(58) Field of Classification Search
USPC .......... 375/146, 219, 220, 259, 260, 262, 265, 375/267, 299; 455/24, 500, 68, 69, 88, 455/553.1, 101, 103
See application file for complete search history.

(56) References Cited

U.S. PATENT DOCUMENTS

| | | |
|---|---|---|
| 6,760,388 B2 | 7/2004 | Ketchum et al. |
| 7,194,042 B2 | 3/2007 | Walton et al. |

(Continued)

FOREIGN PATENT DOCUMENTS

| | | |
|---|---|---|
| JP | 2006-505155 A | 2/2006 |
| JP | 2009-530873 A | 8/2009 |

(Continued)

OTHER PUBLICATIONS

Stephens, et al. "Joint Proposal: High throughput extension to the 802.11 Standard: MAC," IEEE P802.11-05/1095r4 (Jan. 2006).

(Continued)

*Primary Examiner* — Young T. Tse

(57) ABSTRACT

A transmitter beamforming technique for use in a MIMO wireless communication system determines a partial description of a reverse channel without determining a full dimensional description of the reverse channel. A correction matrix is developed from the partial description of the reverse channel and a description of the forward channel. The correction matrix is used to process signals to be transmitted via the forward channel, and a steering matrix is used to perform beamforming in the forward channel.

21 Claims, 13 Drawing Sheets

(56) References Cited

U.S. PATENT DOCUMENTS

| | | | |
|---|---|---|---|
| 7,729,439 | B2 | 6/2010 | Zhang et al. |
| 7,787,554 | B1 | 8/2010 | Nabar et al. |
| 7,965,619 | B2* | 6/2011 | Taira et al. ............... 370/203 |
| 7,978,781 | B2 | 7/2011 | Zhang et al. |
| 2005/0052991 | A1 | 3/2005 | Kadous |
| 2005/0063378 | A1* | 3/2005 | Kadous ............... 370/389 |
| 2005/0078762 | A1 | 4/2005 | Ketchum et al. |
| 2005/0185728 | A1 | 8/2005 | Wallace et al. |
| 2005/0265225 | A1* | 12/2005 | Mahadevappa et al. ...... 370/210 |
| 2006/0079221 | A1* | 4/2006 | Grant et al. ............... 455/423 |
| 2006/0093067 | A1 | 5/2006 | Jalali et al. |
| 2006/0104381 | A1 | 5/2006 | Menon et al. |
| 2006/0126752 | A1 | 6/2006 | Hansen et al. |
| 2007/0041457 | A1 | 2/2007 | Kadous et al. |
| 2007/0230373 | A1 | 10/2007 | Li et al. |
| 2008/0014870 | A1 | 1/2008 | Kim |
| 2008/0227495 | A1* | 9/2008 | Kotecha et al. ............ 455/562.1 |
| 2008/0266176 | A1 | 10/2008 | Nabar et al. |
| 2009/0207765 | A1* | 8/2009 | Yamaura ............... 370/310 |

FOREIGN PATENT DOCUMENTS

| | | |
|---|---|---|
| WO | WO-03/103247 A1 | 12/2003 |
| WO | WO-2005/081483 A1 | 9/2005 |
| WO | WO-2005/101772 A1 | 10/2005 |
| WO | WO-2007/108283 A1 | 9/2007 |
| WO | WO-2007/103085 A3 | 1/2008 |

OTHER PUBLICATIONS

Notice of Reasons for Rejection for Japanese Patent Application No. 2009-528529 mailed Jul. 3, 2012.

"Draft Supplement to Standard [forjInformation technology—Telecommunications and information exchange between systems—Local and metropolitan area networks—Specific requirements, Part 11: Wireless LAN Medium Access Control (MAC) and Physical Layer (PHY) specifications: Further Higher-Speed Physical Layer Extension in the 2.4 GHz Band," IEEE Std. 802.11g/02.8, May 2002.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: High-speed Physical Layer in the 5 GHz Band," IEEE Std. 802.11a, 1999.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHz Band," IEEE Std. 802.11 b, 1999.

802.11 Working Group: "IEEE 802.11 n Part 11: Wireless LAN Medium Access Control (MAC) and Physical Layer (PHY) specifications: Enhancements for Higher Throughput," *IEEE* Mar. 2006, pp. 119-125.

IEEE Standard for Local and metropolitan area networks: Part 16: Air Interface for Fixed and Mobile Broadband Wireless Access Systems/ Amendment 2: Physical and Medium Access Control Layers for Combined Fixed and Mobile operation in Licensed Bands and Corrigendum 1, IEEE Std. 802.16e and IEEE Std. 802.16 2004/Cor 1-2005, Feb. 28, 2006.

IEEE Standard for Local and metropolitan area networks: Part 16: Air Interface for Fixed Broadband Wireless Access Systems—Amendment 2: Medium Access Control Modifications and Additional Physical Layer Specifications for 2-11 GHz, IEEE Std. 802.16a 2003, Apr. 1, 2003.

International Preliminary Report on Patentability for Application No. PCT/US2007/078780, dated Mar. 24, 2009.

International Search Report from corresponding International Application No. PCT/US07/78780 dated Mar. 10, 2008.

S. A. Mujtaba, "IEEE P802.11—Wireless LANS, TGn Sync Proposal Technical Specification," doc.: IEEE 802.11—04/0889r6, May 2005.

Written Opinion from corresponding International Application No. PCT/US07/78780 dated Mar. 10, 2008.

IEEE Std 802.11 b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, 23 pages, Nov. 7, 2001.

IEEE Std 802.11 g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

van Nee, et al. "The 802.11n MIMO-OFDM Standard for Wireless LAN and Beyond," Wireless Personal Communications, vol. 37, pp. 445-453 (Jun. 2006).

Zhang et al., "Applying Antenna Selection in WLANs for Achieving Broadband Multimedia Communications," IEEE Trans. on Broadcasting, vol. 52, No. 4, Dec. 2006.

IEEE Std 802.16-2004 (Revision of IEEE Std 802.16-2001), "IEEE Standard for Local and metropolitan area networks; Part 16: Air Interface for Fixed Broadband Wireless Access Systems," The Institute of Electrical and Electronics Engineers, Inc., Oct. 1, 2004; 893 pages.

IEEE 802.20-PD-06; IEEE P 802.20TMV14, Draft 802.20 Permanent Document; <System Requirements for IEEE 802.20 Mobile Broadband Wireless Access Systems—Version 14>, Jul. 16, 2004; 24 pages.

First Office Action in corresponding Taiwanese Application No. 096134974, dated Sep. 23, 2013.

\* cited by examiner

PRIOR ART

CALIBRATION CORRECTION FOR IMPLICIT BEAMFORMING IN A WIRELESS MIMO COMMUNICATION SYSTEM

RELATED APPLICATION

The present disclosure is a continuation of U.S. application Ser. No. 13/178,387, now U.S. Pat. No. 8,391,397, filed Jul. 7, 2011, entitled "Calibration Correction for Implicit Beamforming in a Wireless MIMO Communication System," which is a continuation of U.S. application Ser. No. 12/785,234, now U.S. Pat. No. 7,978,781, filed on May 21, 2010, which is a continuation of U.S. application Ser. No. 11/857,297, now U.S. Pat. No. 7,729,439, filed on Sep. 18, 2007, which claims priority under 35 U.S.C. §119(e) to U.S. Provisional Application No. 60/845,589, filed on Sep. 18, 2006. All of the applications identified above are hereby incorporated by reference in their entireties.

FIELD OF TECHNOLOGY

The present disclosure relates generally to wireless communication systems and, more particularly, to a system and method for beamforming while transmitting information in a wireless communication system with multiple transmit antennas and multiple receive antennas.

DESCRIPTION OF THE RELATED ART

An ever-increasing number of relatively cheap, low power wireless data communication services, networks and devices have been made available over the past number of years, promising near wire speed transmission and reliability. Various wireless technologies are described in detail in the 802.11 IEEE Standard, including for example, the IEEE Standard 802.11 (1999) and its updates and amendments, the IEEE Standard 802.11a/g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a/d/e/m IEEE Standards, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the different transmit and receive antennas to form separate spatial channels on which additional information is sent, better reception properties can be obtained in a MIMO system by using each of the various transmit antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better reception reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmission antennas to produce high gain lobes in particular or predetermined directions. These techniques include, for example, transmit-MRC (maximum ratio combining) and singular value decomposition (SVD). An important part of determining the steering matrix is taking into account the specifics of the channel between the transmitter and the receiver, referred to herein as the forward channel. As a result, steering matrixes are typically determined based on the CSI of the forward channel. However, to determine the CSI or other specifics of the forward channel, the transmitter must first send a known test or calibration signal to the receiver, which then computes or determines the specifics of the forward channel (e.g., the CSI for the forward channel) and then sends the CSI or other indications of the forward channel back to the transmitter, thereby requiring signals to be sent both from the transmitter to the receiver and then from the receiver back to the transmitter in order to perform beamforming in the forward channel. Moreover, this exchange must occur each time the forward channel is determined (e.g., each time a steering matrix is to be calculated for the forward channel).

To reduce the amount of startup exchanges required to perform beamforming based on CSI or other channel information, it is known to perform implicit beamforming in a MIMO communication system. With implicit beamforming, the steering matrix is calculated or determined based on the assumption that the forward channel (i.e., the channel from the transmitter to the receiver in which beamforming is to be accomplished) can be estimated from the reverse channel (i.e., the channel from the receiver to the transmitter). In particular, the forward channel can ideally be estimated as the matrix transpose of the reverse channel. Thus, in the ideal case, the transmitter only needs to receive signals from the receiver to produce a steering matrix for the forward channel, as the transmitter can use the signals from the receiver to determine the reverse channel, and can simply estimate the forward channel as a matrix transpose of the reverse channel. As a result, implicit beamforming reduces the amount of startup exchange signals that need to be sent between a transmitter and a receiver because the transmitter can estimate the forward channel based solely on signals sent from the receiver to the transmitter.

Unfortunately, however, radio frequency (RF) chain impairments in the form of gain/phase imbalances and coupling losses impair the ideal reciprocity between the forward and the reverse channels, making it necessary to perform additional calibration exchanges each time the forward channel is being determined, to account for these impairments. In any event, these RF chain impairments render the use of implicit beamforming (which estimates the forward channel based solely on an estimate of the reverse channel) inferior in practice.

SUMMARY

In one embodiment, a method of beamforming within a communication system having a first transceiver device having a first plurality of antennas and a second transceiver device having a second plurality of antennas includes determining a partial dimensional description of a reverse channel without determining a full dimensional description of the reverse channel, wherein a signal travels from the second transceiver device to the first transceiver device via the reverse channel. The method also includes developing a correction matrix from the partial dimensional description of the reverse channel and a description of the forward channel via which a signal travels from the first transceiver device to the second transceiver device. The method additionally includes using the correction matrix to process signals to be transmitted via the forward channel, and using a steering matrix to perform beamforming in the forward channel.

In another embodiment, a wireless transceiver for transmitting signals to one or more other communication devices comprises a multiplicity of antennas, and a beamforming network coupled to the multiplicity of antennas. The wireless transmitter additionally comprises a controller coupled to the beamforming network to control the beamforming network using a steering matrix and to use a correction matrix to process signals to be transmitted via a forward channel. The wireless transmitter also comprises a correction matrix calculation unit that obtains a description of the forward channel, obtains a partial dimensional description of a reverse channel, and develops the correction matrix from the description of the forward channel and the partial dimensional description of the reverse channel. The wireless transmitter further comprises a steering matrix calculation unit adapted to develop the steering matrix.

In yet another embodiment, a method of beamforming within a communication system having a first transceiver with a first plurality of antennas and a second transceiver having a second plurality of antennas includes transmitting a calibration initiation packet via a forward channel, the calibration initiation packet including a signal indicative of a request for an acknowledgment packet, wherein a signal travels from the first transceiver to the second transceiver via the forward channel. Also, the method includes receiving via a reverse channel an acknowledgment packet in response to the signal indicative of the request for the acknowledgment packet, wherein a signal travels from the second transceiver to the first transceiver via the reverse channel. Additionally, the method includes determining a partial dimensional description of the reverse channel based on the reception of the acknowledgment packet, and developing a correction matrix based on the partial dimensional description of the reverse channel and a description of the forward channel. Further, the method includes using the correction matrix to process signals to be transmitted via the forward channel, and using a steering matrix to perform beamforming in the forward channel.

In still another embodiment, a wireless transceiver for transmitting signals to one or more other communication devices comprises a multiplicity of antennas, and a beamforming network coupled to the multiplicity of antennas. Also, the wireless transceiver comprises a controller coupled to the beamforming network to control the beamforming network using a steering matrix, to use a correction matrix to process signals to be transmitted via a forward channel, and to cause the transceiver to transmit a calibration initiation packet via the forward channel, the calibration initiation packet including a signal indicative of a request for an acknowledgment packet. Additionally, the wireless transceiver comprises a correction matrix calculation unit that obtains a description of a forward channel via a reverse channel, determines a partial dimensional description of the reverse channel based on a reception of an acknowledgment packet via the reverse channel, and develops the correction matrix from the description of the forward channel and the partial dimensional description of the reverse channel. Further, the wireless transceiver comprises a steering matrix calculation unit adapted to develop the steering matrix.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards.

Figure 1:
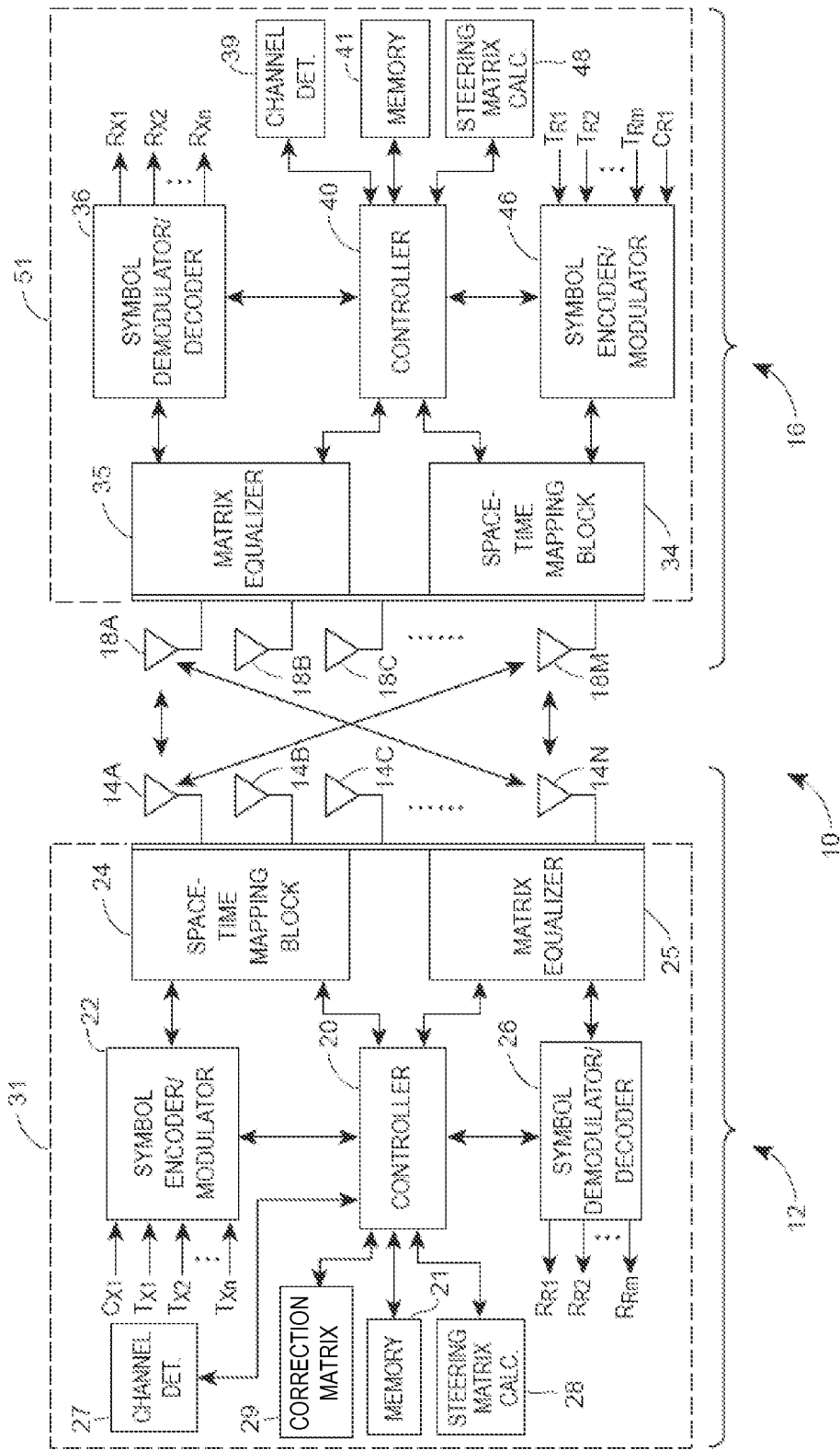
FIG. 1 is a block diagram of a wireless MIMO communication or transmission system that determines and uses a correction matrix as part of an implicit beamforming technique used in a transmitter of the MIMO communication system.

Referring now to FIG. 1, a MIMO communication system 10 is illustrated in block diagram form as generally including a single transceiver device 12 (hereinafter referred to as transmitter 12) having multiple transmission antennas 14A-14N and a single transceiver device 16 (hereinafter referred to as receiver 16) having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28 and a correction matrix calculation unit 29. As will be understood, the processing applied at the transmitter 12 may be based on, for example, the CSI developed by the transmitter 12 in response to a reception of a test or control signal $C_{R1}$ sent by the receiver 16. In particular, a controller 40 or other unit within the receiver 16, such as a channel determination unit 27, may process the received control signal $C_{R1}$ and develop therefrom a measured description of the reverse channel between the transmitter 12 and the receiver 16 by determining or characterizing the propagation effects of the reverse channel on the signal $C_{R1}$ as it traveled through the reverse channel.

The controller 20 may be any desired type of controller and may be implemented as one or more standard multi-purpose, programmable processors, such as micro-processors, as application specific integrated circuits (ASICs), or may be implemented using any other desired types of hardware, software and/or firmware. The channel determination unit 27, the steering matrix calculation unit 28 and the correction matrix calculation unit 29 may be implemented as one or more custom integrated circuits, ASICs, field programmable gate arrays (FPGAs), programmable logic arrays (PLAs), programmable processors, such as micro-processors or digital signal processing processors, or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the channel determination unit 27, the steering matrix calculation unit 28, the correction matrix calculation unit 29, the space-time mapping block 24 and the matrix equalizer 25 may be implemented in the same or in different hardware devices, such as in the same or different processors. Additionally, each of these components of the transmitter 12 may be disposed in a housing 31 (shown in dotted relief in FIG. 1) and the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $L_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 12, to thereby perform beamsteering or beamforming via the transmission antennas 14A-14N.

The signals transmitted by the transmitter 12 are received by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In particular, a controller 40 or other unit within the receiver 16, such as a channel determination unit 39, may process the received control signal $C_{x1}$ and develop therefrom a measured description of the forward channel between the transmitter 12 and the receiver 16 by determining or characterizing the propagation effects of the forward channel on the signal $C_{x1}$ as it traveled through the forward channel. In any event, a symbol demodulator and decoder unit 36, under control of the controller 40, may decode and demodulate the received symbol strings as processed by the matrix equalizer 35. In this process, these signals may be downconverted to baseband. Generally, the demodulator and decoder unit 36 may operate to remove effects of the forward channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI or other measured description of the forward channel for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40, a correction matrix determined by the correction matrix calculation unit 29, etc. may be stored in the memories 21 and 41.

As is generally known, beamforming or beamsteering typically includes applying appropriate phases and gains to the various signals as sent through the multiple transmission antennas 14A-14N, in a manner which causes the signals sent from the different transmission antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16 or to the receiver 16 in general.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. Generally speaking, the steering matrix for any particular frequency channel of the MIMO system 10 (in the forward channel between the transmitter 12 and the receiver 16) may be determined by the steering matrix calculation unit 28 based on the CSI determined for that forward channel. In this case, the steering matrix calculation unit 28 may use any desired beam steering or matrix computation techniques, such as transmit-MRC or SVD techniques, to compute the steering matrix. As these techniques are well known in the art, they will not be discussed in detail herein.

However, as is known, to actually determine the CSI or other measured description of the forward channel, i.e., for the channel from the transmitter 12 to the receiver 16, the transmitter 12 generally sends a known control or test signal to the receiver 16 (e.g., the signal $C_{x1}$) and the receiver 16 may then determine the CSI or other measured description of the forward channel and send this information back to the transmitter 12 as part of a payload of a transmission. In the event of explicit beamforming, in this case, the transmitter 12 must first send a test or control signal to the receiver 16 which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel. In explicit transmit beamforming, RF chain imbalance should not impact the beamforming performance, as the forward channel is explicitly known. Additionally, in the case of implicit beamforming, to avoid the use of multiple communication between a particular transmitter/receiver pair each time a steering matrix is to be computed for the forward channel, the transmitter 12 may determine the CSI or other measured description of the reverse channel, i.e., the channel from the receiver 16 to the transmitter 12, from the signal(s) sent from the receiver 16 including, for example the known test or control signal $C_{R1}$. Based on the CSI or other measured description of the reverse channel, the transmitter 12 may calculate the steering matrix for the forward channel.

To reduce or account for the errors introduced by RF chain impairments in a standard implicit beamforming technique, the transmitter 12 may use a calibration technique that applies a correction matrix during the beamforming process to compensate for measured differences between the actual forward and reverse channels. In particular, this technique first determines a correction matrix as a function of measured descriptions of the forward and the reverse channels. Then, each time a new steering matrix is to be calculated for the forward channel, the beamforming technique applies the correction matrix to a steering matrix determined using a basic implicit beamforming technique, so that, once the correction matrix is determined, the transmitter may simply perform implicit beamforming using a measured description of the reverse channel (i.e., the channel between the receiver and the transmitter) to produce an estimate of the forward channel (i.e., the channel between the transmitter and the receiver). Alternatively, the transmitter 12 may also calculate correction matrices for its receive chains, so that once the correction matrix is determined, the transmitter may apply it to the reverse channel (i.e., the channel from the receiver 16 to the transmitter 12) estimation, and perform implicit beamforming using a measured description of this processed reverse channel estimate to produce an estimate of the forward channel (i.e., the channel from the transmitter 12 to the receiver 16). The calibration procedure may be conducted infrequently, compared with steering matrix updates. For example, it may be conducted only upon association of the device into the network, or upon the changes in the environment (e.g. a change in temperature).

Transmission from the transmitter 12 (Station A) to the receiver 16 (Station B) can be modeled as:

$$y_B = \tilde{H}_{AB} Q_A x_A + n_B, \qquad \text{(Equ. 1)}$$

where $y_B$ and $n_B$ are the received signal vector and additive noise vector at Station B, respectively; $\tilde{H}_{AB}$ is the equivalent channel from Station A to Station B; $x_A$ is the signal vector to be transmitted from Station A; and $Q_A$ is the steering matrix (which may be a vector) at Station A that spreads the signal vector onto actual transmitting chains at Station A. $Q_A$ may be designed based on the knowledge of $\tilde{H}_{AB}$ at station A using. In the transmitter 12, the steering matrix $Q_A$ may be determined by the steering matrix calculation unit 28 based, for example, on the CSI determined for the channel from the transmitter 12 to the receiver 16. The steering matrix $Q_A$ may be determined using a variety of techniques, including techniques known to those of ordinary skill in the art In implicit transmit beamforming, Station A determines an estimation of $\tilde{H}_{AB}$ based on an estimate of the channel from Station B to Station A. In the case of time-division duplexing (TDD), the forward link and the reverse link share the same frequency band, so their physical propagation channels, denoted as $H_{AB}$ and $H_{BA}$ respectively, can be assumed reciprocal ($H_{AB} = H_{BA}^T$), if the channel is varying slowly compared to the interval between forward and reverse link transmissions.

However, the actual channels observed at baseband also include the equivalent radio frequency (RF) responses of the transmit and receive chains, which might not be identical for the transmit and receive chains in the same device. This imbalance results in the actual channels $\tilde{H}_{AB}$ and $\tilde{H}_{BA}$ not being reciprocal. The mathematical description of this imbalance issue may be represented as:

$$\tilde{H}_{AB}=C_{B,Rx}H_{AB}C_{A,Tx}, \quad \text{(Equ. 2)}$$

where $C_{B,Rx}$ represents the RF responses at the receive chains of Station B; and where $C_{A,Tx}$ represents the RF responses at the transmit chains of Station A. By ignoring the coupling among transmit and receive chains, the matrices $C_{B,Rx}$ and $C_{B,Rx}$ can be approximately modeled as diagonal matrices.

The equivalent channel from Station B to Station A, $\tilde{H}_{BA}$, can be represented as:

$$\tilde{H}_{BA}=C_{A,Rx}H_{AB}{}^{T}C_{B,Tx}, \quad \text{(Equ. 3)}$$

Due to the imbalance, $C_{A,Tx} \neq C_{A,Rx}{}^T$ and/or $C_{B,Tx} \neq C_{B,Rx}{}^T$, and thus $\tilde{H}_{AB} \neq \tilde{H}_{BA}{}^T$.

One or both devices may compensate the transmit and receiver RF imbalance at baseband. For example, one or more correction matrices may be calculated and then multiplied with the transmitted or received signal vector in the base band to correct the imbalance and maintain reciprocity between the transmit and receive channels. For example, a transmitter-side correction matrix $K_{A,Tx}$ and a receiver-side correction matrix $K_{B,Rx}$ may be calculated such that they may be able to completely compensate for the imbalance. Thus, a corrected equivalent channel from Station A to Station B $\hat{H}_{AB}$ may be represented as:

$$\hat{H}_{AB}=K_{B,Rx}\tilde{H}_{AB}K_{A,Tx}=\alpha\tilde{H}_{BA}{}^T, \quad \text{(Equ. 4)}$$

where $\alpha$ can be any scalar. Equation 4 is indicative of a system that may be referred to as a strict reciprocity system. To implement a strict reciprocity system, Station A may left-multiply the correction matrix $K_{A,Tx}$ with the signal it is to transmit ($Q_A x_A$) at baseband. Also, upon receiving the signal, Station B may left-multiply the correction matrix $K_{B,Rx}$ with the received signal at baseband.

An alternative approach is to calculate the correction matrices for the reverse channel: $K_{A,Rx}$ and/or $K_{B,Tx}$, such that:

$$\hat{H}_{BA}=K_{A,Rx}\tilde{H}_{BA}K_{B,Tx}=\alpha'\cdot\hat{H}_{AB}{}^T, \quad \text{(Equ. 5)}$$

where $\alpha'$ can be any scalar. To implement strict reciprocity, Station B may left-multiply the correction matrix $K_{B,Tx}$ with the reverse channel sounding signal it is to transmit at baseband. Also, upon receiving the signal, Station A may left-multiply the correction matrix $K_{A,Rx}$ with the estimated reverse channel at baseband.

Many implicit transmit beamforming methods only utilize transmitter-side compensation. In these cases, $\hat{H}_{AB}$ may be represented as:

$$\hat{H}_{AB}=\tilde{H}_{AB}K_{A,Tx}=D_B\tilde{H}_{BA}{}^T, \quad \text{(Equ. 6)}$$

where $D_B$ is a diagonal matrix representing the imbalance at Station B. Equation 6 is indicative of a system that may be referred to as a semi-reciprocal system. With semi-reciprocity, only transmitter-side compensation need be utilized. To implement a semi-reciprocal system, Station A may left-multiply the correction matrix $K_{A,Tx}$ with the signal it is to transmit ($Q_A x_A$) at baseband. Upon receiving the signal, Station B need not apply a correction matrix, such as the correction matrix $K_{B,Rx}$, with the received signal. Similarly, the transmitter-side compensation may also be applied at the receiver chains of the same device, i.e. to realize semi-reciprocity, Station A may left-multiply the correction matrix $K_{A,Rx}$ with the reverse channel estimates at baseband:

$$\hat{H}_{BA}=K_{A,Rx}\tilde{H}_{BA}. \quad \text{(Equ. 7)}$$

$$\hat{H}_{AB}=D'_B\tilde{H}_{BA}{}^T. \quad \text{(Equ. 8)}$$

Here we use the forward channel correction (c.f. Equations 1,2,3,4,5) to illustrate the proposed calibration methods. The extension to reverse channel correction matrix will be straightforward to one of ordinary skill in the art.

Figure 2:
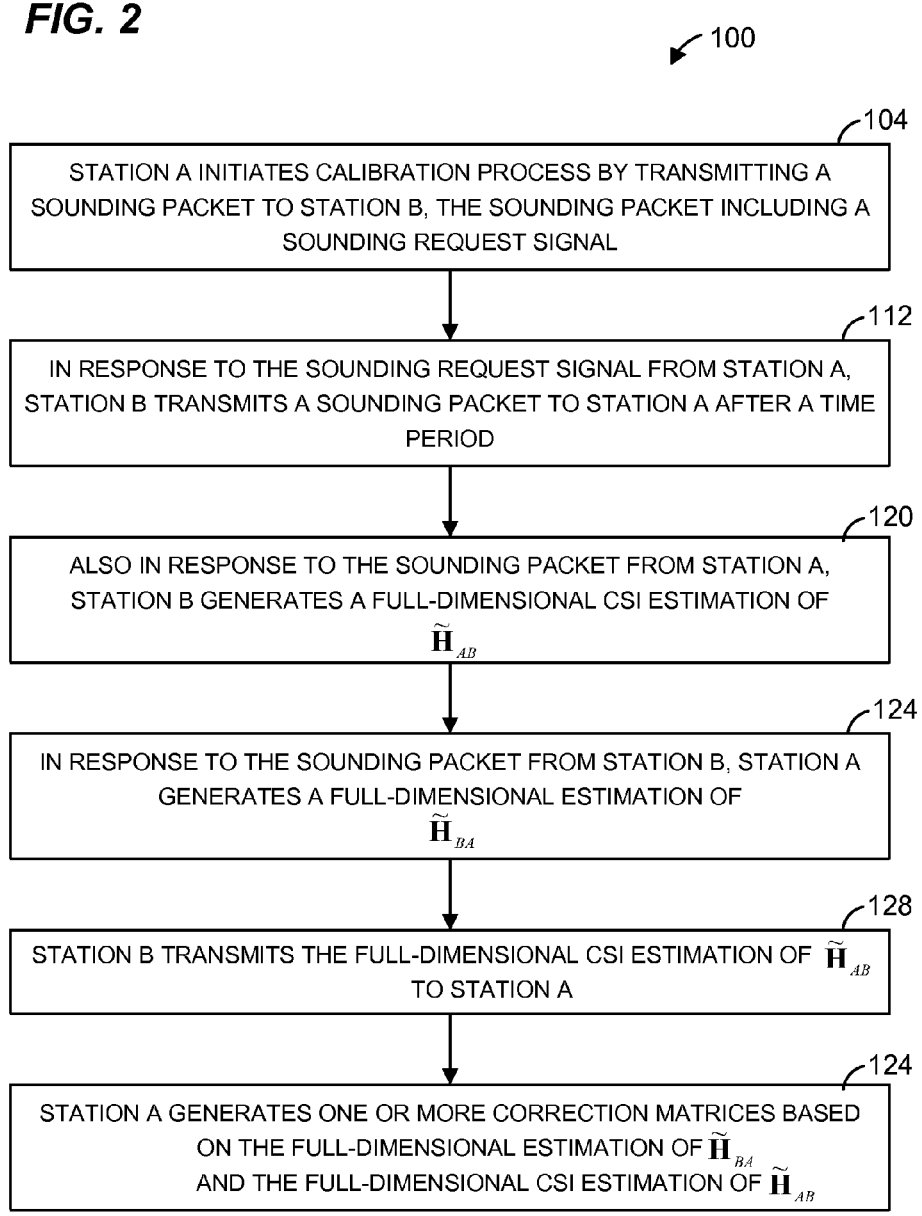
FIG. 2 is a flow diagram of a prior art method for calibrating a station in a wireless network.
Figure 3:
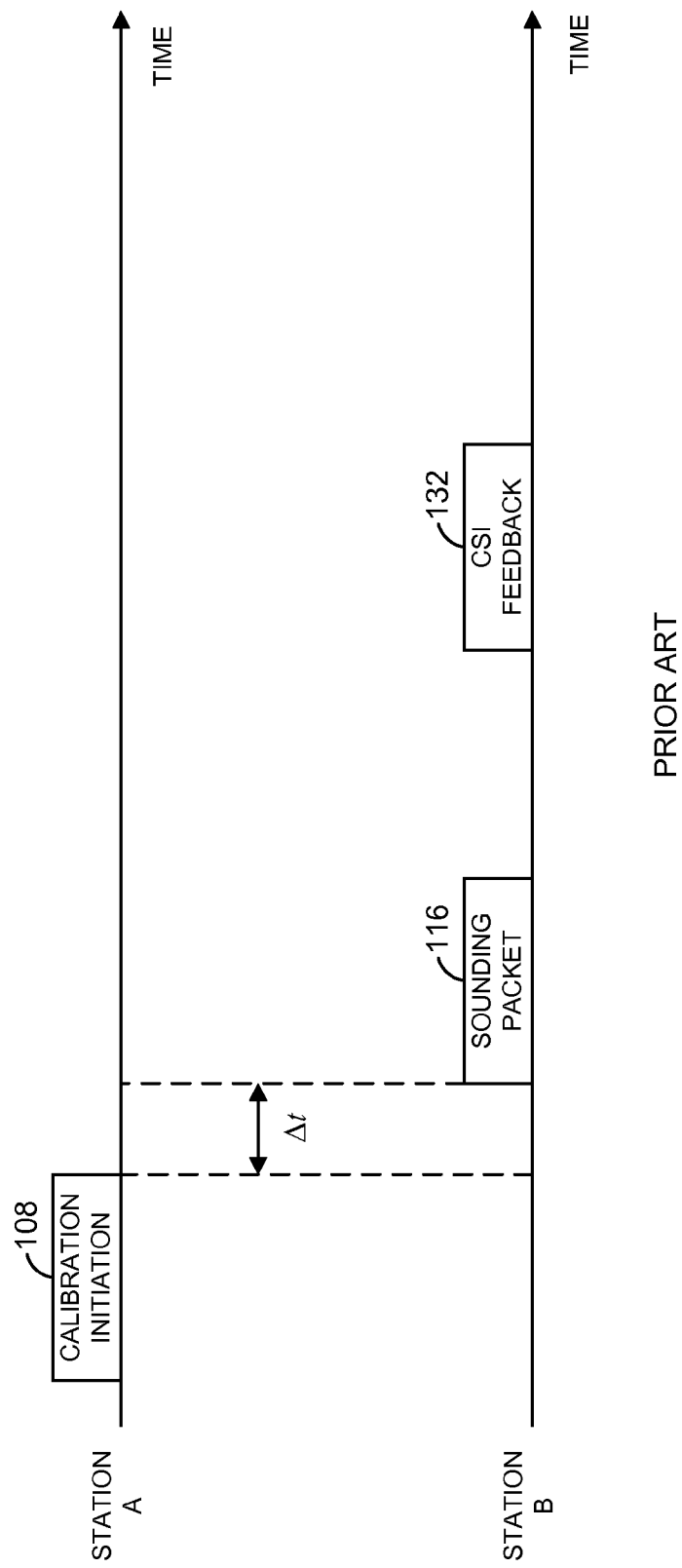
FIG. 3 is a timing diagram illustrating communications between a Station A and a Station B during the calibration method of FIG. 2.

FIG. 2 is a flow diagram of a prior art method 100 for calibrating a station in a wireless network. The method 100 will be described with reference to FIG. 3, which is a timing diagram illustrating communications between a Station A and a Station B during the calibration method 100. At a block 104, Station A initiates a calibration process by sending a sounding packet 108 to Station B. A sounding packet is a physical layer packet in a packet switched wireless network that contains training information for all available spatial dimensions of a multiple-antenna channel. The sounding packet 108 sent at the block 104 includes a "sounding request" signal, which indicates to Station B that Station A is requesting that Station B transmit a sounding packet to Station A.

At a block 112, in response to receiving the sounding packet 108 with the sounding request signal, Station B transmits a sounding packet 116 after a time period $\Delta t$, which is defined by the wireless network requirement, and in general should be short. For example, in draft IEEE 802.11n WLANs, $\Delta t$ is 16 microseconds, and is referred to as the short inter-frame space (SIFS). At a block 120, also in response to receiving the sounding packet 108 with the sounding request signal, Station B generates a full-dimensional channel state information (CSI) estimation of $\tilde{H}_{AB}$.

At a block 124, in response to receiving the sounding packet 116, Station A generates an estimate of the full-dimensional reverse channel $\tilde{H}_{BA}$ based on the training information in the sounding packet 116.

At a block 128, after Station B generates the full-dimensional CSI estimation of $\tilde{H}_{AB}$ (block 120), Station B transmits it back to Station A via a CSI feedback packet 132. According to many wireless network protocols, transmission of the CSI feedback packet 132 typically is not considered time critical.

At a block 136, after receiving the CSI feedback packet 132, Station A calculates the correction matrix $K_{A,Tx}$ using the estimate of the full-dimensional reverse channel $\tilde{H}_{BA}$ (block 124) and the full-dimensional CSI estimation of $\tilde{H}_{AB}$ (block 120).

An alternative way in the prior art of doing calibration (with references to FIGS. 2 and 3) includes: (1) STATION A sends out a calibration initiation packet, which is not a sounding packet; (2) STATION B responds by sending a sounding packet for STATION A to estimate full-dimensional reverse channel CSI $\tilde{H}_{BA}$; (3) STATION A sends a sounding packet for STATION B to estimate $\tilde{H}_{AB}$; (4) STATION B feeds back the full-dimensional forward channel CSI of $\tilde{H}_{AB}$ to STATION A; and (5) STATION A calculates the correction matrices.

In the prior art method 100, generation of the sounding packet 116 by Station B is a relatively time-critical task because the sounding packet 116 should be transmitted after a relatively short time period $\Delta t$. Thus, complex/expensive hardware in Station B is required so that the sounding packet can be generated quickly. Additionally, a single sounding packet 116 includes enough information for calibrating every receiver chain of the Station A. Because the sounding packet 116 will be received by multiple receiver chains of the Station A, the sounding packet 116 includes more information than is necessary for calibrating Station A.

Figure 4:
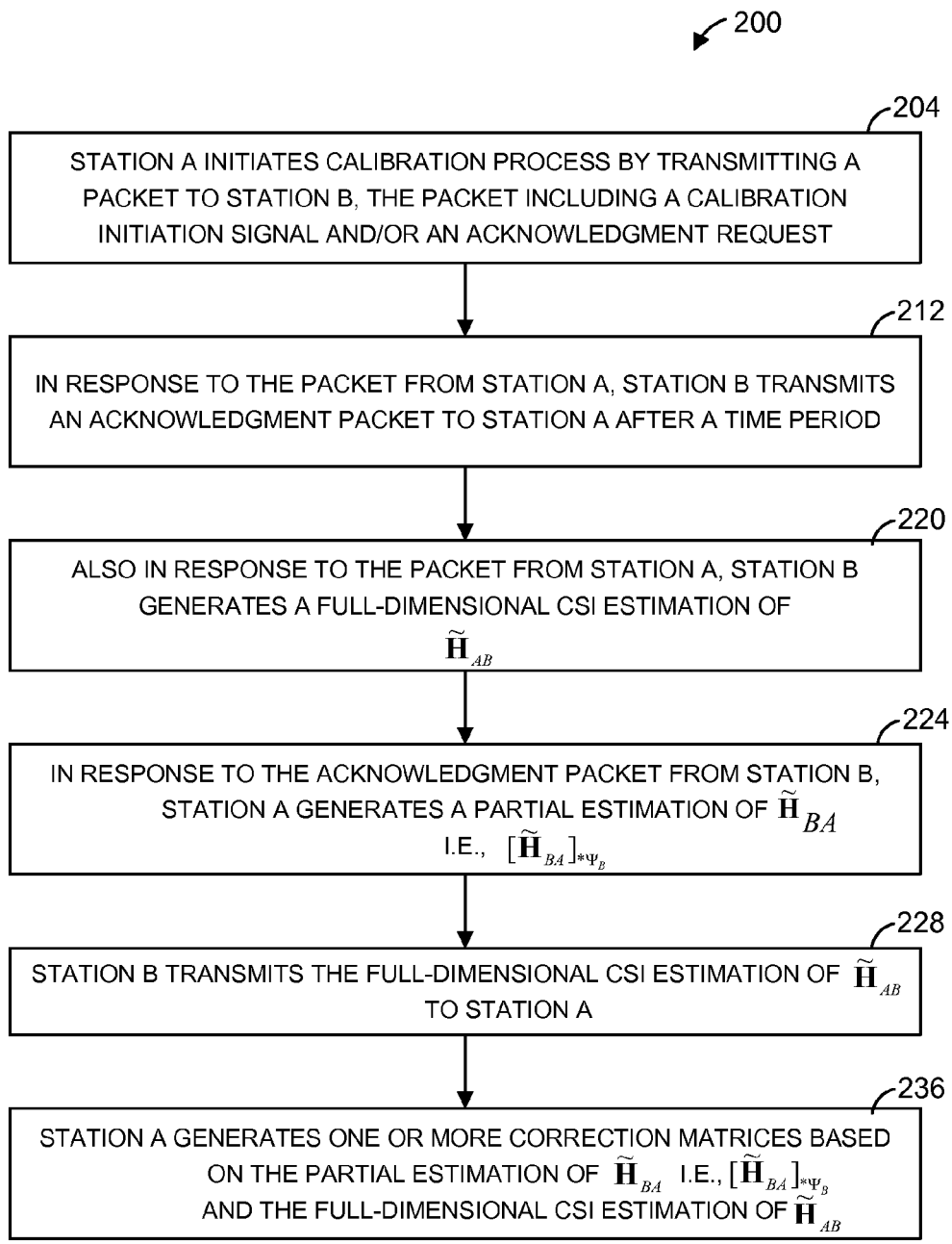
FIG. 4 is a flow diagram of an example method for calibrating a station in a wireless network.
Figure 5:
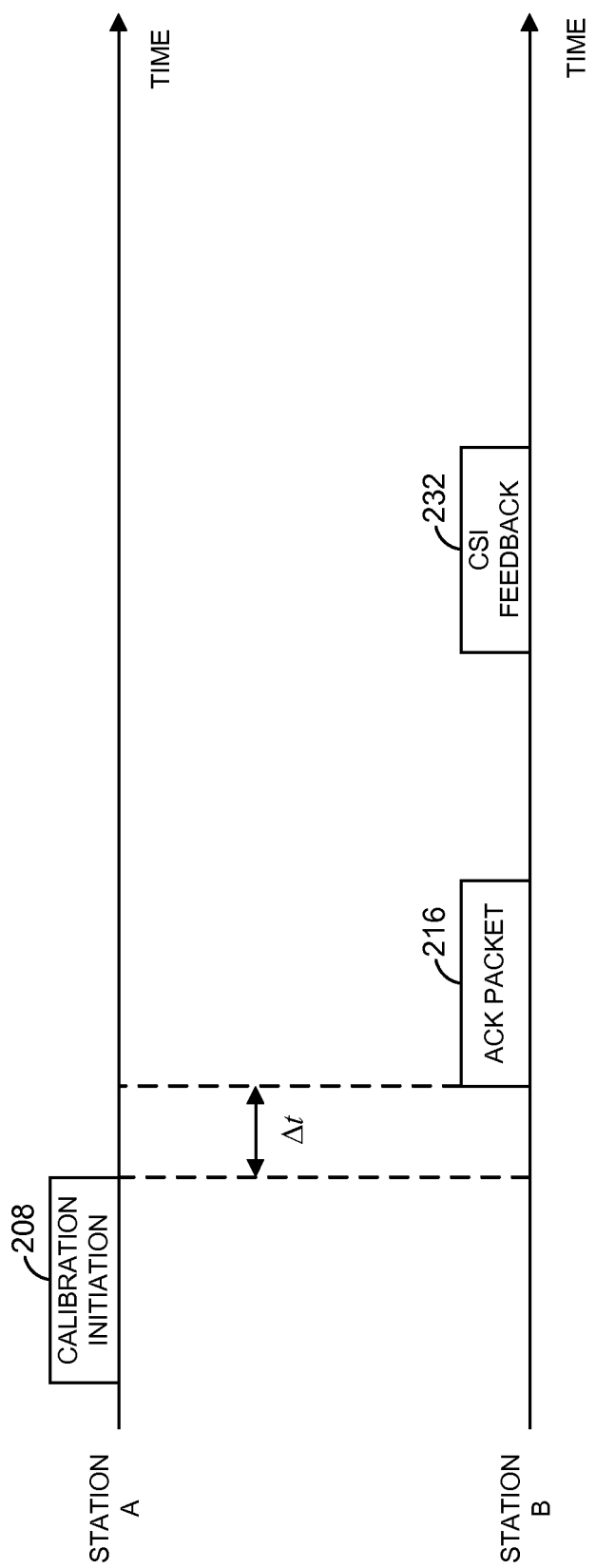
FIG. 5 is a timing diagram illustrating communications between a Station A and a Station B during the calibration method of FIG. 4.
Figure 6:
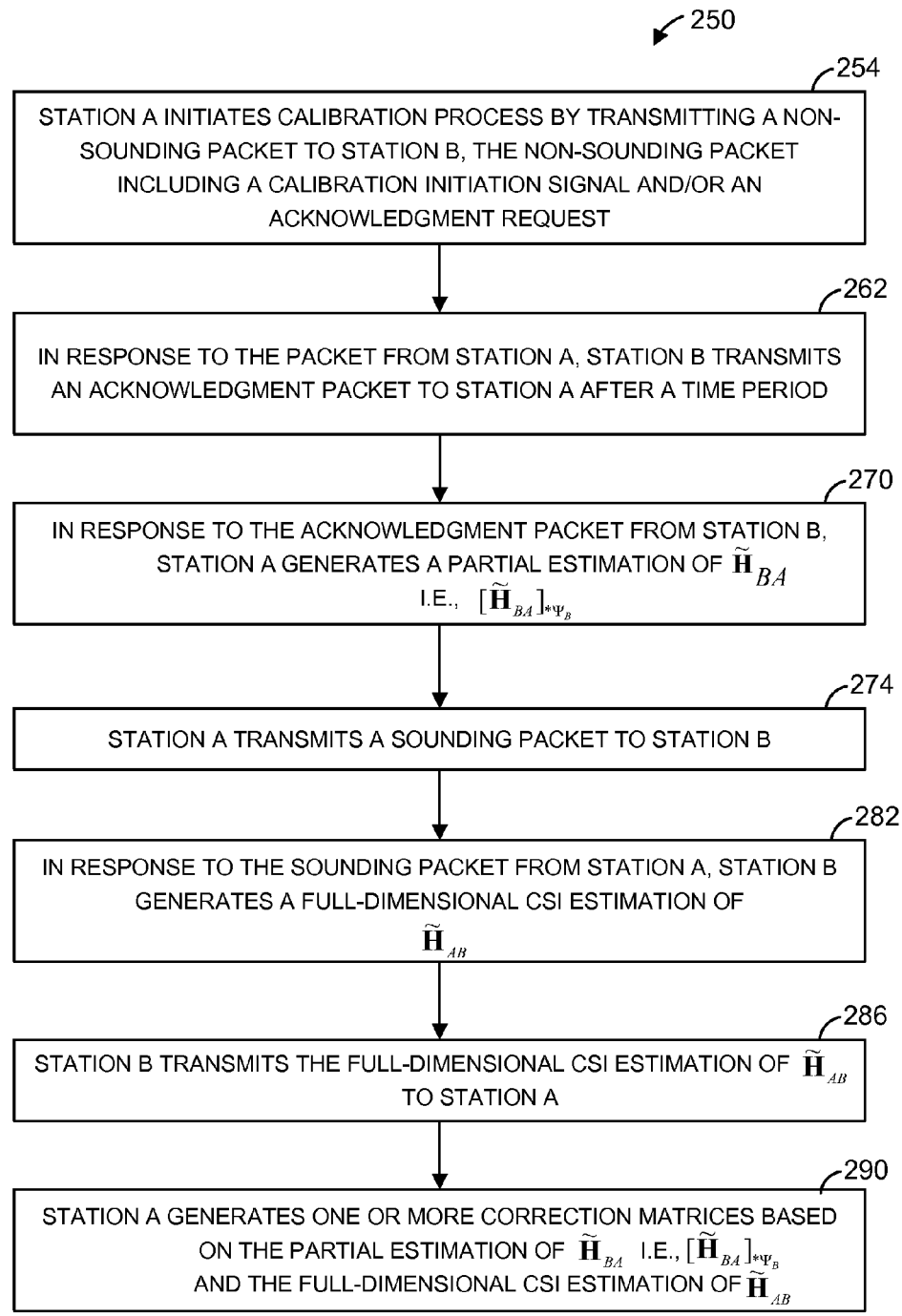
FIG. 6 is a flow diagram of another example method for calibrating a station in a wireless network.
Figure 7:
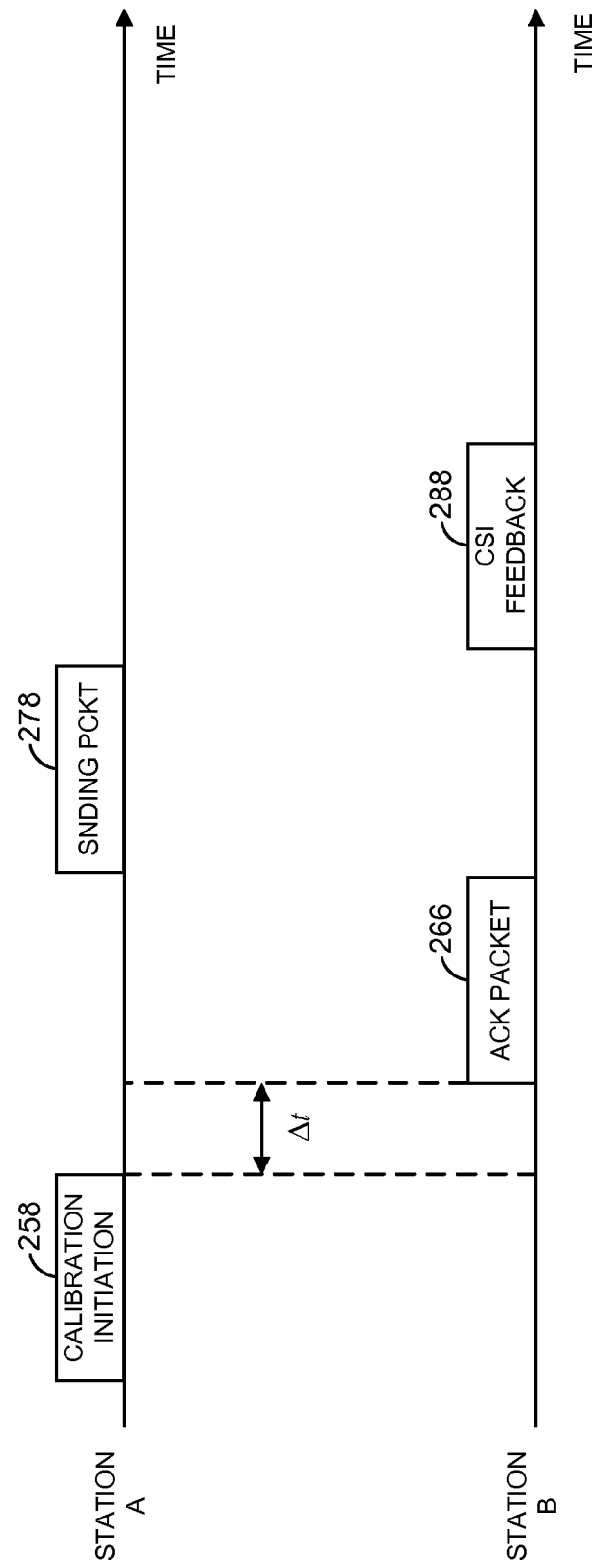
FIG. 7 is a timing diagram illustrating communications between a Station A and a Station B during the calibration method of FIG. 6.

FIG. 4 is a flow diagram of an example method 200 for calibrating a station in a wireless network. The method 200 will be described with reference to FIG. 5, which is a timing diagram illustrating communications between a Station A and a Station B during the calibration method 200. At a block 204, Station A initiates a calibration process by sending a packet 208 to Station B. The packet 208 sent at the block 204 may include a "calibration initiation" signal, which indicates to Station B that Station A is requesting to initialize calibration. The calibration initiation signal may be sent at a physical layer or a media access control layer, for example, of a wireless communication protocol. The packet 208 also may include an acknowledgement request. The packet 208 may be a sounding packet, for example.

At a block 212, in response to receiving the packet 208 with the calibration initiation signal, Station B transmits an acknowledgment packet 216 after a time period Δt, which is defined by the wireless network requirement, and in general should be short. For example, in draft IEEE 802.11n WLANs, Δt is 16 microseconds, and is referred to as the SIFS. When transmitting the acknowledgement packet 216, Station B sets its spatial steering matrix $Q_B$ to a predetermined $N_{ss\_B} \times N_{ss\_B}$ square matrix, such as the identity matrix I, a Hadamard matrix, a discrete Fourier transform (DFT) matrix, etc., where $N_{ss\_B}$ is the number of data streams transmitted by the acknowledgement packet 216, which could be less than the number of transmit antennas at STATION B. The acknowledgment packet 216 is a not a sounding packet because it does not include training information for all available spatial dimensions of a multiple-antenna channel. Rather, the acknowledgment packet 216 includes training information of only spatial dimensions used for the current data transmission of the acknowledgment packet 216. Such as packet may be referred to as a non-sounding packet.

At a block 220, also in response to receiving the packet 108 with the calibration initiation signal, Station B generates a full-dimensional channel state information (CSI) estimation of $\tilde{H}_{AB}$.

At a block 224, in response to receiving the acknowledgment packet 216, Station A generates an estimate of a potentially partial portion of the reverse channel $\tilde{H}_{BA}$ based on the reception of the acknowledgement packet 216. For example, the acknowledgment packet 216 may permit the generation of a subset of the columns of $\tilde{H}_{BA}$. This may be denoted as $[\tilde{H}_{BA}]*_{\Psi_B}$, where $\Psi_B$ includes the column indices in $\tilde{H}_{BA}$ that are trained by the acknowledgment packet 216. Typically, the acknowledgment packet 216 may permit the generation of one or two columns of $\tilde{H}_{BA}$. Of course, in some implementations, the acknowledgment packet 216 may permit the generation of three, four or more columns of $\tilde{H}_{BA}$.

At a block 228, after Station B generates the full-dimensional CSI estimation of $\tilde{H}_{AB}$ (block 220), Station B transmits it back to Station A via a CSI feedback packet 232. According to many wireless network protocols, transmission of the CSI feedback packet 232 typically is not considered time critical.

At a block 236, after receiving the CSI feedback packet 232, Station A calculates the correction matrix $K_{A,Tx}$ using $[\tilde{H}_{BA}]*_{\Psi_B}$ (block 224) and the corresponding columns in $\tilde{H}_{AB}$ (block 220) denoted as $[\tilde{H}_{AB}]*_{\Psi_B}$. Also, Station A may additionally or alternatively calculate a correction matrix $K_{A,Rx}$. Example methods for generating the correction matrices $K_{A,Tx}$ and $K_{A,Rx}$ will be described below.

FIG. 4A is a flow diagram of another example method 250 for calibrating a station in a wireless network. The method 250 will be described with reference to FIG. 5A, which is a timing diagram illustrating communications between a Station A and a Station B during the calibration method 250. At a block 204, Station A initiates a calibration process by sending a packet 258 to Station B. The packet 258 sent at the block 254 may include a "calibration initiation" signal, which indicates to Station B that Station A is requesting to initialize calibration. The calibration initiation signal may be sent at a physical layer or a media access control layer, for example, of a wireless communication protocol. The packet 258 also may include an acknowledgement request. The packet 258 is not a sounding packet. In other words, the packet 258 is a non-sounding packet.

At a block 262, in response to receiving the packet 258 with the calibration initiation signal, Station B transmits an acknowledgment packet 266 after a time period Δt. The acknowledgment packet 266 may be a non-sounding packet. The block 262 may be similar to the block 212 discussed above with respect to FIG. 4.

At a block 270, in response to receiving the acknowledgment packet 266, Station A generates an estimate of a potentially partial portion of the reverse channel $\tilde{H}_{BA}$ based on the reception of the acknowledgment packet 266. The block 270 may be similar to the block 224 discussed above with respect to FIG. 4.

At a block 274, Station A generates and transmits a sounding packet 278 to Station B. The packet 278 is a sounding packet because it includes training information for all available spatial dimensions of a multiple-antenna channel.

At a block 282, in response to receiving the sounding packet 278 with the calibration initiation signal, Station B generates a full-dimensional channel state information (CSI) estimation of $\tilde{H}_{AB}$. At a block 286, Station B transmits the full-dimensional CSI estimation of $\tilde{H}_{AB}$ back to Station A via a CSI feedback packet 288. According to many wireless network protocols, transmission of the CSI feedback packet 232 typically is not considered time critical.

At a block 290, after receiving the CSI feedback packet 288, Station A calculates the correction matrix $K_{A,Tx}$ using $[\tilde{H}_{BA}]*_{\Psi_B}$ (block 270) and the corresponding columns in $\tilde{H}_{AB}$ (block 282) denoted as $[\tilde{H}_{AB}]*_{\Psi_B}$. Also, Station A may additionally or alternatively calculate a correction matrix $K_{A,Rx}$.

Although in FIG. 5A it is shown that Station A transmits the sounding packet 278 after receiving the acknowledgment packet 266, it should be understood that Station A may transmit the sounding packet 278 after receiving or during reception of the acknowledgment packet 266.

When used for implicit transmit beamforming and correction on the forward channel, Station A may left-multiply $K_{A,Tx}$ with the signal it is to transmit $(Q_A x_A)$ at baseband. Optionally, Station A may modify the steering matrix $Q_A$ with the correction matrix by, for example, left-multiplying $K_{A,Tx}$ with $Q_A$. Similarly, Station A may left-multiply $K_{A,Rx}$ with the signal it receives from Station B ($y_A = \tilde{H}_{BA} Q_B x_B + n_A$, where $y_A$ and $n_A$ are the received signal vector and additive noise vector at Station A, respectively; $\tilde{H}_{BA}$ is the equivalent channel from Station B to Station A; $x_B$ is the signal vector to be transmitted from Station B; and $Q_B$ is the steering matrix (which may be a vector) at Station B that spreads the signal vector onto actual transmitting chains at Station B) at baseband).

One of ordinary skill in the art will recognize many variations to the method 200. For instance, blocks may be omitted, reordered, additional blocks may be inserted, and/or blocks may be modified. As one example, the Station B need not send two separate packets. In particular, the full-dimensional CSI estimation of $\tilde{H}_{AB}$ may be transmitted in the acknowledgment packet 216, rather than in the separate packet 232. Thus, the order of the blocks 212 and 220 may be reversed, and the block 212 may be modified so that the full-dimensional CSI estimation of $\tilde{H}_{AB}$ is included in the acknowledgment packet 216. Also, the block 228 may be omitted and combined with the block 212.

As another example, instead of the Station B setting its spatial steering matrix $Q_B$ to the predetermined diagonal matrix at the block 212, a different approach may optionally be utilized. In this approach, the Station B receives the number of transmit chains at the Station A by, for example, a preliminary capability exchange and/or the dimensionality signaling in the previous sounding packet sent by the Station A in at the block 204. Then, Station B may calculate a maximum number, $N_{STS,max}$, of data streams available in the reverse link channel. Next, the acknowledgment packet 216 may then be sent by a modulation/coding scheme with a dimensionality of $N_{STS,max}$ and the smallest constellation size and coding rate allowed in the system (e.g. BPSK with ½ convolutional code in WLANs). In this approach, any predetermined steering matrix $Q_B$ can be used, i.e., it need not be diagonal, but could be.

The method 200 of FIG. 4 may be implemented by the system 10 of FIG. 1. Of course, the method 200 may be implemented by other systems as well. Also, the system 10 need not implement the method 200, but may alternatively implement other methods.

For example, the controller 20 may cause the packet 208 to be sent to the receiver 16 (block 204). The controller 30 may cause the acknowledgment packet 216 to be sent to the transmitter 12 (block 212). The channel determination unit 39 may generate the full-dimensional CSI estimation of $\tilde{H}_{AB}$ (block 220), and the controller 40 may cause this information to be sent back to the transmitter (block 228). The correction matrix calculation unit 29 may generate $[\tilde{H}_{BA}]_{*\Psi_B}$ (block 224).

The correction matrix calculation unit 29 also may generate the one or more correction matrices (block 236). The space-time mapping block 24 may left-multiply the correction matrix $K_{A,Tx}$ with the signal to be transmitted at baseband. Optionally, the steering matrix calculation block 28 may modify the steering matrix $Q_A$ using the correction matrix $K_{A,Tx}$ by, for example, left-multiplying the correction matrix $K_{A,Tx}$ with the steering matrix $Q_A$ to generate a modified steering matrix. Alternatively, the correction matrix calculation unit 29 may modify the steering matrix $Q_A$ using the correction matrix $K_{A,Tx}$. Also, the matrix equalizer 25 may left-multiply the correction matrix $K_{A,Rx}$ with the signal it receives from the station 16 at baseband.

The method 250 of FIG. 4A may be implemented by the system 10 of FIG. 1. Of course, the method 250 may be implemented by other systems as well. Also, the system 10 need not implement the method 250, but may alternatively implement other methods.

For example, the controller 20 may cause the non-sounding packet 258 to be sent to the receiver 16 (block 254). The controller 30 may cause the acknowledgment packet 266 to be sent to the transmitter 12 (block 262). The correction matrix calculation unit 29 may generate $[\tilde{H}_{BA}]_{*\Psi_B}$ (block 270). The controller 20 may cause the sounding packet 278 to be sent to the receiver 16 (block 274). The channel determination unit 39 may generate the full-dimensional CSI estimation of $\tilde{H}_{AB}$ (block 282), and the controller 40 may cause this information to be sent back to the transmitter (block 286). The correction matrix calculation unit 29 also may generate the one or more correction matrices (block 290). The space-time mapping block 24 may left-multiply the correction matrix $K_{A,Tx}$ with the signal to be transmitted at baseband. Optionally, the steering matrix calculation block 28 may modify the steering matrix $Q_A$ using the correction matrix $K_{A,Tx}$ by, for example, left-multiplying the correction matrix $K_{A,Tx}$ with the steering matrix $Q_A$ to generate a modified steering matrix. Alternatively, the correction matrix calculation unit 29 may modify the steering matrix $Q_A$ using the correction matrix $K_{A,Tx}$. Also, the matrix equalizer 25 may left-multiply the correction matrix $K_{A,Rx}$ with the signal it receives from the station 16 at baseband.

Figure 8:
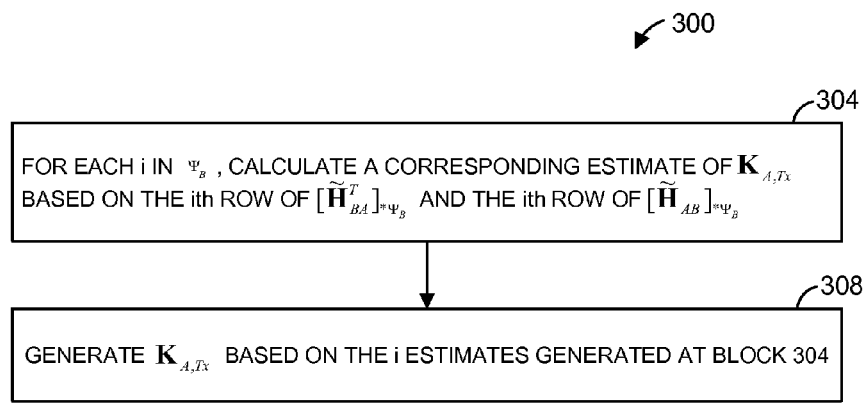
FIG. 8 is a flow diagram of an example method for generating a correction matrix based on a partial estimation of a reverse channel and corresponding information from an estimation of a forward channel.

FIG. 8 is a flow diagram of an example method 300 for generating a correction matrix based on the partial estimation of the reverse channel $\tilde{H}_{BA}$ (i.e., $[\tilde{H}_{BA}]_{*\Psi_B}$) and the corresponding information in $\tilde{H}_{AB}$ (i.e., $[\tilde{H}_{AB}]_{*\Psi_B}$). In this example method, it is assumed that the correction matrix to be generated, $K_{A,Tx}$, is a diagonal matrix.

At a block 304, for $i \in \Psi_B$, a corresponding estimate of $K_{A,Tx}$ may be calculated based on the i-th row in $[\tilde{H}_{AB}]_{*\Psi_B}$ and the i-th row in $[\tilde{H}_{BA}^T]_{*\Psi_B}$. The k-th element of the i-th row of $[\tilde{H}_{AB}]_{*\Psi_B}$ may be written as:

$$[\tilde{H}_{AB}]_{ki} = c_{B,Rx\_i}[H_{AB}]_{ik}c_{A,Tx\_k}, \quad \text{(Equ. 9)}$$

Similarly, the k-th element of the i-th row of $[\tilde{H}_{BA}^T]_{*\Psi_B}$ is the k-th element of the i-th column of $[\tilde{H}_{BA}]_{*\Psi_B}$, which may be written as:

$$[\tilde{H}_{BA}]_{ki} = c_{A,Rx\_k}[H_{AB}]_{ik}c_{B,Tx\_i}, \quad \text{(Equ. 10)}$$

The (k,k) element of the diagonal correction matrix $K_{A,Tx}$ corresponding to i may be determined as:

$$[K_{A,Tx}]_{kk} = \frac{[\tilde{H}_{BA}]_{ki}}{[\tilde{H}_{AB}]_{ik}} \quad \text{(Equ. 11)}$$

$$= \left(\frac{c_{B,Tx\_i}}{c_{B,Rx\_i}}\right)\frac{c_{A,Rx\_k}}{ck}$$

$$= \alpha\frac{c_{A,Rx\_k}}{c_{A,Tx\_k}},$$

where $$\alpha = \frac{c_{B,Tx\_i}}{c_{B,Rx\_i}}, \quad \text{(Equ. 12)}$$

Thus, for example, the (1,1) element of $K_{A,Tx}$ corresponding to i may be determined as:

$$[K_{A,Tx}]_{11} = \frac{[\tilde{H}_{BA}]_{1i}}{[\tilde{H}_{AB}]_{i1}} \quad \text{(Equ. 13)}$$

$$= \left(\frac{c_{B,Tx\_i}}{c_{B,Rx\_i}}\right)\frac{c_{A,Rx\_1}}{c_{A,Tx\_1}}$$

$$= \alpha\frac{c_{A,Rx\_1}}{c_{A,Tx\_1}},$$

Similarly, the (2,2) element of $K_{A,Tx}$ corresponding to i may be determined as:

$$[K_{A,Tx}]_{22} = \frac{[\tilde{H}_{BA}]_{2i}}{[\tilde{H}_{AB}]_{i2}} \quad \text{(Equ. 14)}$$

$$= \alpha\frac{c_{A,Rx\_2}}{c_{A,Tx\_2}},$$

As can be seen from Equations 11-14, $\hat{H}_{AB} = \tilde{H}_{AB}K_{A,Tx} = \alpha C_{B,Rx}H_{AB}C_{A,Rx} = \alpha D_B \tilde{H}_{BA}^T$, where $D_B = C_{B,Rx}C_{B,Tx}^{-1}$, and the calibrated channels are semi-reciprocal.

At a block 308, the correction matrix $K_{A,Tx}$ can be generated based on the i estimates generated at the block 304. As just one example, the correction matrix $K_{A,Tx}$ could be generated base on an average of the i estimates. For instance, the (1,1) element could be generated as an average of the i estimates of the (1,1) element generated at the block 304. Similarly, the (2,2) element could be generated as an average of the i estimates of the (2,2) element generated at the block 304, etc.

The correction matrix $K_{A,Rx}$ can be calculated by inverting the correction matrix $K_{A,Tx}$. Alternatively, the correction matrix $K_{A,Rx}$ can be calculated according to a method similar to the method 300 and equations similar to Equations 8 and 9. Then, the correction matrix $K_{A,Tx}$ can be calculated by inverting the correction matrix $K_{A,Rx}$.

If calibration is intended for compensating only phase shift differences between the transmit and receive chains, another method for generating a correction matrix based on the partial estimation of the reverse channel $\tilde{H}_{BA}$ (i.e., $[\tilde{H}_{BA}]_{*\psi_B}$) and the corresponding information in $\tilde{H}_{AB}$ (i.e., $[\tilde{H}_{AB}]_{*\psi_B}$) optionally may be utilized. For example, the right singular matrixes that define each of the forward channel $[\tilde{H}_{AB}]_{*\psi_B}$ and the estimate of the forward channel $[\tilde{H}_{BA}]_{*\psi_B}$ may be determined. In particular, a singular value decomposition (SVD) method or any other method or technique which determines a set of right singular matrixes that accurately describes or defines the forward channel $[\tilde{H}_{AB}]_{*\psi_B}$ and another set of right singular matrixes that accurately describes or defines the estimate of the forward channel $[\tilde{H}_{BA}]_{*\psi_B}$ may be utilized. This determination can be expressed mathematically as:

$$[\tilde{H}_{AB}]_{\psi_{B^*}} = U_F \Sigma V_F^H, \quad \text{(Equ. 15)}$$

and $$[\tilde{H}_{BA}^T]_{\psi_{B^*}} = U_I \Sigma' V_I^H, \quad \text{(Equ. 16)}$$

where $U_F$ and $U_I$ are the left singular matrixes for the partial forward channel $[\tilde{H}_{AB}]_{*\psi_B}$ and the partial estimate of the forward channel $[\tilde{H}_{BA}^T]_{*\psi_B}$; and $V_F$ and $V_I$ are the right singular matrixes which define the partial forward channel and the partial estimate of the forward channel determined using, for example, an SVD technique. The superscript H in Equations 12 and 13 above denotes the conjugate transpose of the associated matrix while the $\Sigma$ function in these equations denotes the diagonal singular value matrix. If SVD is utilized, it may be calculated so that the first row of $V_F$ and the first row of $V_I$ are comprised of real and positive elements. The correction matrix may then be calculated as:

$$K_{A,Tx} = V_F V_I^H, \quad \text{(Equ. 14)}$$

The diagonal of the calculated correction matrix can be made to correspond to pure phase shifts by normalization, for example.

The correction matrix $K_{A,Rx}$ can be calculated by inverting the correction matrix $K_{A,Tx}$ determined using Equation 14. Alternatively, the correction matrix $K_{A,Rx}$ can be calculated according to equations similar to Equations 12-14. Then, the correction matrix $K_{A,Tx}$ can be calculated by inverting the correction matrix $K_{A,Rx}$.

It may be possible to develop other correction factors or matrices that compensate for the effects of RF chain impairments and other non-equalities that prevent the partial forward channel $[\tilde{H}_{AB}]_{*\psi_B}$ from equaling or being the same as the partial estimated channel $[\tilde{H}_{BA}^T]_{*\psi_B}$ developed from the reverse channel $\tilde{H}_{BA}$, and these other correction factors or matrices may be used as well or instead of the correction matrices specifically described herein.

Generation of correction matrices in the correction matrix calculation unit 29 typically is implemented at least partially in hardware (e.g., The techniques described above are applicable, for example, in any single-carrier or multi-carrier (e.g., orthogonal frequency division multiplexing (OFDM) systems) systems that support data packet tranceiving, and with multiple antennas at the transmitter. With a multi-carrier system, calibration processes and calculations such as described above may be conducted for each carrier. For example, in an OFDM system, calibration processes and calculations such as described above may be conducted for each sub-carrier.

After the correction matrix $K_{A,Tx}$ and/or the correction matrix $K_{A,Rx}$ are generated, these matrices may be stored in the memory 21 or in any other desired memory. The steering matrix calculation unit 28 may, thereafter, simply determine a new steering matrix using implicit beamforming, i.e., by determining an uncompensated or implicit steering matrix using any standard implicit beamforming technique, e.g., based on the assumption that an inferred channel (i.e., the estimate of the forward channel) $\tilde{H}_{BA}^T$ is equal to the actual forward channel $\tilde{H}_{AB}$, but then multiplying the uncompensated steering matrix by the correction matrix $K_{A,Tx}$ to create a compensated or corrected steering matrix that takes into account the errors introduced by RF chain impairments. As will be understood using this technique, once the correction matrix $K_{A,Tx}$ has been obtained for the forward channel between a particular transmitter/receiver pair, the transmitter can determine a new steering matrix for the forward channel at any time using implicit beamforming and the correction matrix $K_{A,Tx}$ (and thus relying only on signals transmitted from the receiver to the transmitter, i.e., in the reverse channel).

Figure 9:
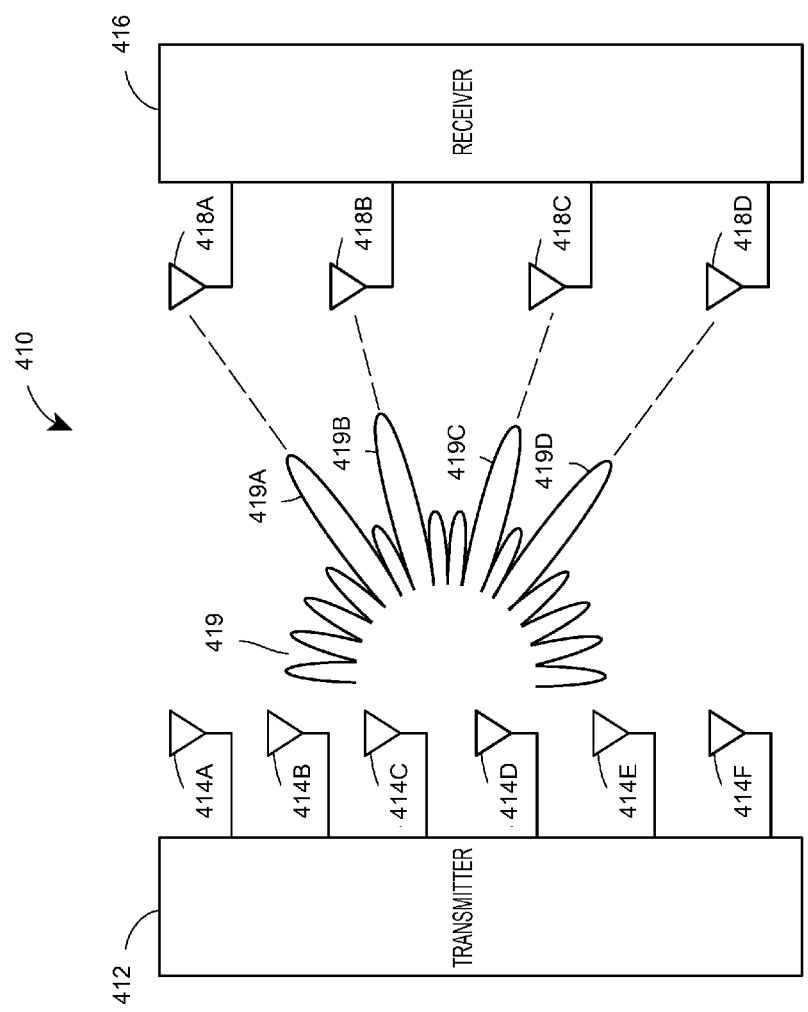
FIG. 9 is a block diagram illustrating a transmit gain pattern for wireless communications between a single transmitter and a single receiver implementing a transmitter beamforming technique that uses a calibration factor as part of an implicit beamforming technique.

To illustrate the techniques described herein, FIG. 9 shows a MIMO communication system 410 having a single transmitter 412 with six transmission antennas 414A-414F, and a single receiver 416 with four receiver antennas 418A-418D. In this example, the steering matrix is developed by the transmitter 412 using a corrected steering matrix developed in the manner described above to create a transmit gain pattern 419 as shown disposed next to the transmitter 412. As illustrated in FIG. 9, the transmit gain pattern 419 includes multiple high gain lobes 419A-419D generally disposed in the directions of the receiver antennas 418A-418D. The high gain lobes 419A-419D are orientated in the directions of propagation from the transmitter 412 to the particular receiver antennas 418A-418D while lower gain regions, which may even include one or more nulls, are produced in other directions of propagation. While FIG. 9 illustrates a separate high gain lobe directed to each of the receiver antennas 418A-418D, it will be understood that the actual gain pattern produced by the beam steering matrix calculations using implicit beamforming and a correction matrix may not necessarily include a separate high gain lobe for each of the receiver antennas 418A-418D. Instead, the gain pattern developed by the beam steering matrix for the transmitter 412 may have a single high gain lobe covering or directed generally to more than one of the receiver antennas 418A-418D. Thus, it is to be understood that the beam pattern resulting from the creation of a steering matrix using implicit beamforming and a calibration factor may or may not have separate high gain lobes separated by low gain regions or nulls for each of the receiver antennas.

Of course, developing the beam pattern 419 to have high gain regions and low gain regions based on a correction matrix may be performed in any desired manner and location. For example, any of the components within the receiver 16 of FIG. 1, including the controller 40, the steering matrix calculation unit 48 and the channel determination unit 39 may determine the CSI or other measured description of the forward channel and, if desired may determine the right singular matrixes for the forward channel from this information. The receiver 16 may then send any of this determined information to the transmitter 12. If desired, however, the receiver 16 may simply collect the known signal received from the transmitter 12 and may send this signal back to the transmitter 12 without processing this signal in any significant manner, and the transmitter 12 may then determine the measured description of the forward channel from this information. In either case, the controller 20 and/or the steering matrix calculation unit 28 and/or the correction matrix calculation unit 29 within the transmitter 12 may use the information determined about the forward channel and/or the reverse channel to calculate and apply the correction matrix in modifying the steering matrix and/or for use in the space-time mapping block 24 to thereby implement beamforming in the forward channel.

It will be understood that the correction matrix equations, e.g., the computation of the correction matrix, may be performed at any desired location within the wireless communication system 10 of FIG. 1, including within the controller 20 or other hardware, software, or firmware of the transmitter 12, as well as within the controller 40 or other hardware, software, or firmware of the receiver 16. In the later case, the receiver 16 may compute at least some of the forward channel information to be used by the transmitter 12 based on the specifics of the forward channel determined at the receiver 16 and, if desired, the CSI developed by the receiver 16, and may send this information to the transmitter 12 to be used in calculating the correction matrix. On the other hand, the steering matrix for the transmitter space-time mapping block 24 of FIG. 1 may be calculated by the steering matrix calculation unit 28 within the transmitter 12 based on raw channel data or signals sent by the receiver 16 provided and sent back from the receiver 16 to the transmitter 12.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. In this case, the transmitter may perform or implement a separate correction matrix calculation for each receiver to which the transmitter will transmit and may therefore develop a different steering matrix and/or correction matrix for each of the possible receivers, and may use those steering matrixes to beamform to the separate or different receivers at different times or using different channels, e.g., OFDM channels, of the system. Moreover, while the maximum gains of the high gain lobes of each of the transmit gain patterns illustrated in FIG. 9 are shown as being the same, the steering matrix calculation units 28 and 48 may develop steering matrixes which produce high gain lobes with differing maximum gains.

While the beamforming and correction matrix calculations described herein are described in one example as being implemented in hardware, these calculations alternatively or additionally be implemented in software stored in, for example, one of the memories 21, 41 and implemented on a processor associated with one or both of the controllers 20, 40, the steering matrix calculation units 28, 48 and/or the units 29 and 39 of the MIMO communication system 10 of FIG. 1, or implanted in firmware as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

More generally, the various blocks, operations, and techniques described above may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium).

The present invention may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 10A-10H, various example devices that may embody the present invention are shown.

Figure 10A:
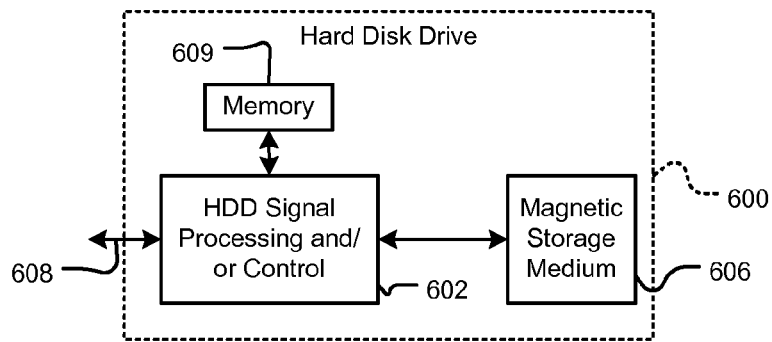
FIG. 10A is a block diagram of a hard disk drive system that may utilize a periodic signal detector.

For example, referring to FIG. 10A, a hard disk drive 600 may utilize beamforming techniques such as described above and which may be implemented by signal processing and/or control circuits, which are generally identified in FIG. 10A at 602. In some implementations, signal processing and/or control circuit 602 and/or other circuits (not shown) in HDD 600 may process data, perform coding and/or encryption, perform calculations, and/or format data that is output to and/or received from a magnetic storage medium 606.

HDD 600 may communicate with a host device (not shown) such as a computer, mobile computing devices such as personal digital assistants, cellular phones, media or MP3 players and the like, and/or other devices via one or more wired or wireless communication links 608. HDD 600 may be connected to memory 609, such as random access memory (RAM), a low latency nonvolatile memory such as flash memory, read only memory (ROM) and/or other suitable electronic data storage.

Figure 10B:
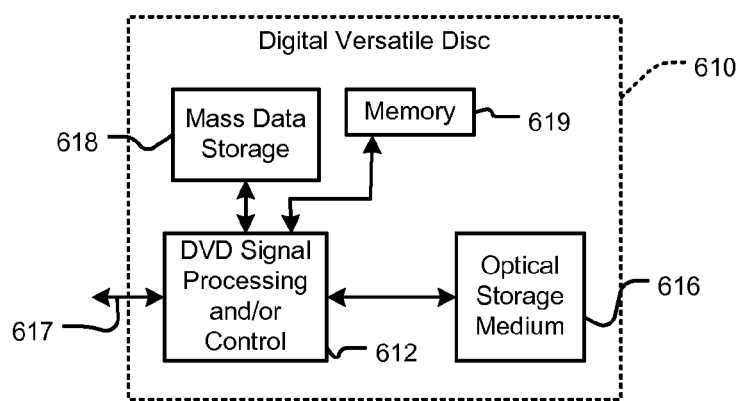
FIG. 10B is a block diagram of a digital versatile drive system that may utilize a periodic signal detector.

Referring now to FIG. 10B, a digital versatile disc (DVD) drive 610 may utilize beamforming techniques such as described above. The beamforming techniques may be implemented by either or both signal processing and/or control circuits, which are generally identified in FIG. 10B at 612, and/or mass data storage 618 of DVD drive 610. Signal processing and/or control circuit 612 and/or other circuits (not shown) in DVD 610 may process data, perform coding and/or encryption, perform calculations, and/or format data that is read from and/or data written to an optical storage medium 616. In some implementations, signal processing and/or control circuit 612 and/or other circuits (not shown) in DVD 610 can also perform other functions such as encoding and/or decoding and/or any other signal processing functions associated with a DVD drive.

DVD drive 610 may communicate with an output device (not shown) such as a computer, television or other device via one or more wired or wireless communication links 617. DVD 610 may communicate with mass data storage 618 that stores data in a nonvolatile manner. Mass data storage 618 may include a hard disk drive (HDD) such as that shown in FIG. 10A. The HDD may be a mini HDD that includes one or more platters having a diameter that is smaller than approximately 1.8". DVD 610 may be connected to memory 619, such as RAM, ROM, low latency nonvolatile memory such as flash memory, and/or other suitable electronic data storage.

Figure 10C:
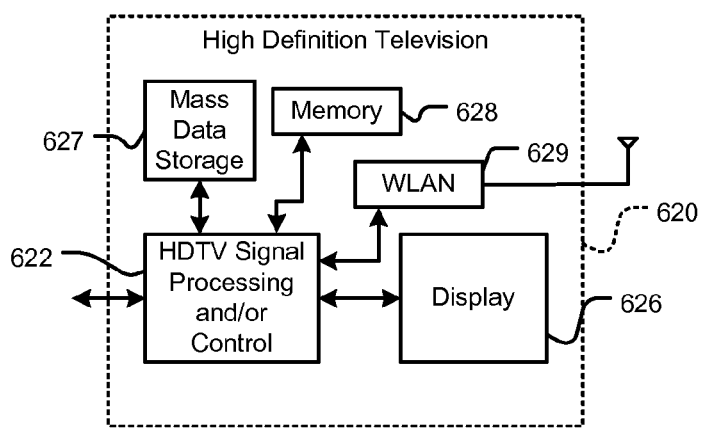
FIG. 10C is a block diagram of a high definition television that may utilize a periodic signal detector.

Referring to FIG. 10C, a high definition television (HDTV) 620 may utilize beamforming techniques such as described above. The HDTV 620 includes signal processing and/or control circuits, which are generally identified in FIG. 10C at 622, a WLAN interface 629, and a mass data storage 627. The beamforming techniques may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). At least one HDD may have the configuration shown in FIG. 10A and/or at least one DVD may have the configuration shown in FIG. 10B. One or more of the HDDs may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via a WLAN network interface 629.

Figure 10D:
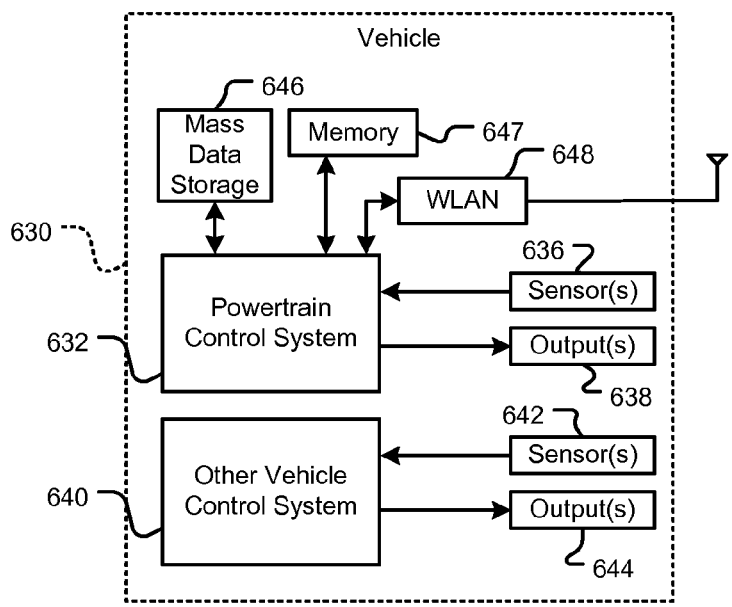
FIG. 10D is a block diagram of a vehicle that may utilize a periodic signal detector.

Referring now to FIG. 10D, a control system of a vehicle 630 may utilize beamforming techniques such as described above. In some implementations, beamforming techniques may be implemented by a powertrain control system 632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The beamforming techniques may also be implemented in other control systems 640 of vehicle 630. Control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. At least one HDD may have the configuration shown in FIG. 10A and/or at least one DVD may have the configuration shown in FIG. 10B. One or more of the HDDs may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. The methods, systems, techniques, etc., described above may also be implemented in the WLAN interface 648. For example, beamforming may be implemented in the WLAN interface 648. The control system 640 may also include mass data storage, memory and/or a WLAN interface (all not shown).

Figure 10E:
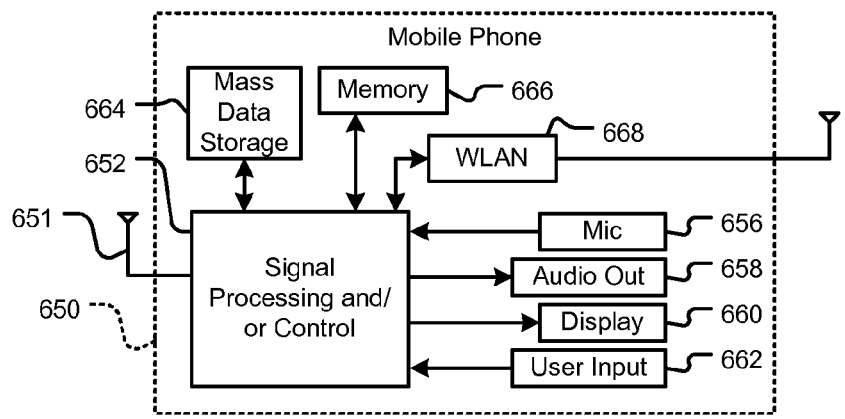
FIG. 10E is a block diagram of a mobile phone that may utilize a periodic signal detector.

Referring now to FIG. 10E, a mobile phone 650 (e.g., a cellular phone) that may include an antenna 651 may utilize beamforming techniques such as described above. The phone 650 includes signal processing and/or control circuits, which are generally identified in FIG. 10E at 652, a WLAN interface 668, and a mass data storage 664. The beamforming techniques may be implemented in the signal processing and/or control circuits 652 and/or the WLAN interface 668, for example. In some implementations, phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Phone 650 may communicate with mass data storage 664 that stores data in a nonvolatile manner such as optical and/or magnetic storage devices for example hard disk drives HDD and/or DVDs. At least one HDD may have the configuration shown in FIG. 10A and/or at least one DVD may have the configuration shown in FIG. 10B. At least one HDD may be a mini HDD that includes one or more platters having a diameter that is smaller than approximately 1.8". Phone 650 may be connected to memory 666 such as RAM, ROM, low latency nonvolatile memory such as flash memory and/or other suitable electronic data storage. Phone 650 also may support connections with a WLAN via a WLAN network interface 668.

Figure 10F:
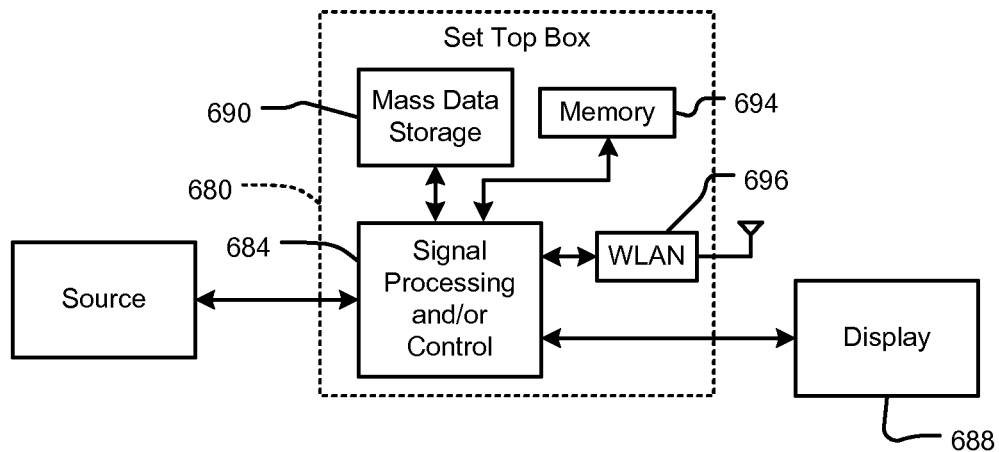
FIG. 10F is a block diagram of a set top box that may utilize a periodic signal detector.

Referring now to FIG. 10F, a set top box 680 may utilize beamforming techniques such as described above. The set top box 680 includes signal processing and/or control circuits, which are generally identified in FIG. 10F at 684, a WLAN interface 696, and a mass data storage device 690. The beamforming techniques may be implemented in the signal processing and/or control circuits 684 and/or the WLAN interface 696, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may have the configuration shown in FIG. 10A and/or at least one DVD may have the configuration shown in FIG. 10B. At least one HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via a WLAN network interface 696.

Figure 10G:
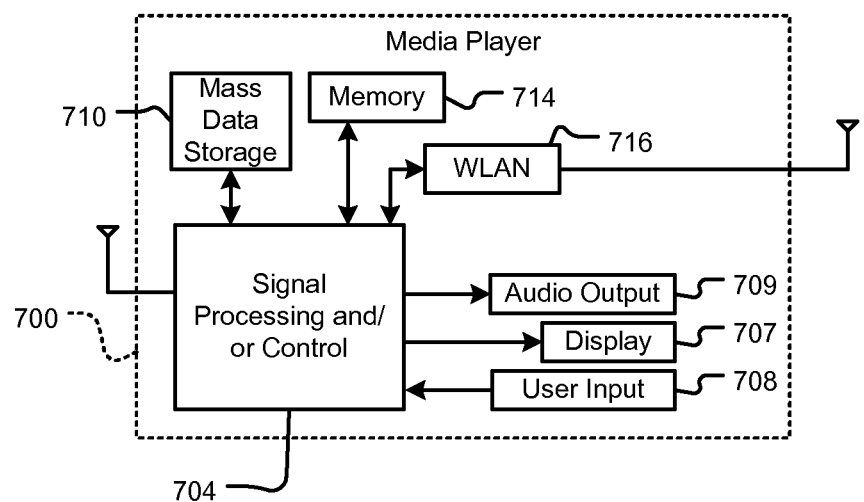
FIG. 10G is a block diagram of a media player that may utilize a periodic signal detector.

Referring now to FIG. 10G, a media player 700 may utilize beamforming techniques such as described above. The media player 700 may include signal processing and/or control circuits, which are generally identified in FIG. 10G at 704, a WLAN interface 716, and a mass data storage device 710. The beamforming techniques may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 10A and/or at least one DVD may have the configuration shown in FIG. 10B. At least one HDD may be a mini HDD that includes one or more platters having a diameter that is smaller than approximately 1.8". Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 10H:
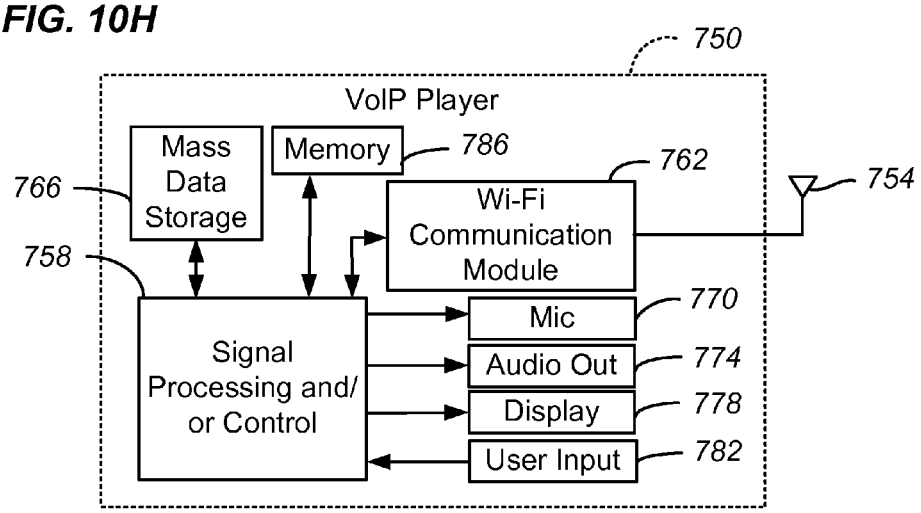
FIG. 10H is a block diagram of a voice over IP device that may utilize a periodic signal detector.

Referring to FIG. 10H, a Voice over Internet Protocol (VoIP) phone 750 may utilize beamforming techniques such as described above. The VoIP phone 750 may include an antenna 754, signal processing and/or control circuits 758, a wireless interface 762, and a mass data storage 766. The beamforming techniques may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. At least one HDD may have the configuration shown in FIG. 10A and/or at least one DVD may have the configuration shown in FIG. 10B. At least one HDD may have the configuration shown in FIG. 10A and/or at least one DVD may have the configuration shown in FIG. 10B. The HDD may be a mini HDD that includes one or more platters having a diameter that is smaller than approximately 1.8". VoIP phone 750 may be connected to memory 786, which may be a RAM, ROM, low latency nonvolatile memory such as flash memory and/or other suitable electronic data storage. VoIP phone 750 is configured to establish communications link with a VoIP network (not shown) via Wi-Fi communication module 762.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
   determining, at a first transceiver device, a partial dimensional description of a reverse multiple input, multiple output (MIMO) channel based on a reception of a first packet received from a second transceiver device via the reverse MIMO channel, wherein the first packet includes training information of spatial dimensions used for the transmission of the first packet but does not include training information for all available spatial dimensions of the reverse MIMO channel, wherein the reverse MIMO channel corresponds to a signal direction from the second transceiver device to the first transceiver device;
   developing, at the first transceiver device, a correction matrix from (i) the partial dimensional description of the reverse MIMO channel and (ii) a description of a forward MIMO channel, wherein the forward MIMO channel corresponds to a signal direction from the first transceiver device to the second transceiver device; and
   using, at the first transceiver device, the correction matrix to process signals to be transmitted via the forward MIMO channel.

2. A method according to claim 1, further comprising:
   causing, at the first transceiver device, a second packet to be transmitted via the forward MIMO channel, wherein the second packet includes a request to initiate calibration.

3. A method according to claim 2, wherein the first packet is an acknowledgment of the second packet.

4. A method according to claim 1, further comprising receiving the description of the forward MIMO channel from the second transceiver device.

5. A method according to claim 4, wherein receiving the description of the forward MIMO channel comprises receiving channel state information via a second packet.

6. A method according to claim 4, further comprising causing, at the first transceiver device, a second packet to be transmitted via the forward MIMO channel, wherein
the second packet includes training information for all available spatial dimensions of the forward MIMO channel, and
the second packet is configured to prompt the second transceiver device to transmit the description of the forward MIMO channel to the first transceiver device.

7. A method according to claim 1, wherein determining the partial dimensional description of the reverse MIMO channel comprises determining the partial dimensional description of the reverse MIMO channel without determining a full dimensional description of the reverse MIMO channel.

8. A method according to claim 1, wherein determining the partial dimensional description of the reverse MIMO channel comprises determining a subset of columns of a matrix corresponding to a full-dimensional description of the reverse MIMO channel.

9. A method according to claim 8, wherein developing the correction matrix comprises:
determining a respective correction matrix estimate for each column in the subset of columns of the matrix corresponding to the full-dimensional description of the reverse MIMO channel; and
generating the correction matrix using the respective correction matrix estimates.

10. A method according to claim 8, wherein developing the correction matrix comprises:
calculating a first singular value decomposition corresponding to the subset of columns of the matrix corresponding to the full-dimensional description of the reverse MIMO channel;
determining a subset of rows of a matrix corresponding to the description of the forward MIMO channel;
calculating a second singular value decomposition corresponding to the subset of rows of the matrix corresponding to the description of the forward MIMO channel; and
generating the correction matrix based on the first singular value decomposition and the second singular value decomposition.

11. A method according to claim 8, wherein developing the correction matrix comprises:
calculating a first right singular matrix corresponding to the subset of columns of the matrix corresponding to the full-dimensional description of the reverse MIMO channel;
determining a subset of rows of a matrix corresponding to the description of the forward MIMO channel;
calculating a second right singular matrix corresponding to the subset of rows of the matrix corresponding to the description of the forward MIMO channel; and
generating the correction matrix based on the first right singular matrix and the second right singular matrix.

12. A tangible, non-transitory computer readable medium or media storing machine readable instructions that, when executed by one or more processors, cause the one or more processors to:
determine a partial dimensional description of a reverse multiple input, multiple output (MIMO) channel based on a reception of a first packet received from a second transceiver device via the reverse MIMO channel, wherein the first packet includes training information of spatial dimensions used for the transmission of the first packet but does not include training information for all available spatial dimensions of the reverse MIMO channel, wherein the reverse MIMO channel corresponds to a signal direction from the second transceiver device to a first transceiver device;
develop a correction matrix from (i) the partial dimensional description of the reverse MIMO channel and (ii) a description of a forward MIMO channel, wherein the forward MIMO channel corresponds to a signal direction from the first transceiver device to the second transceiver device; and
use the correction matrix to process signals to be transmitted via the forward MIMO channel.

13. A tangible, non-transitory computer readable medium or media according to claim 12, further storing machine readable instructions that, when executed by the one or more processors, cause the one or more processors to:
cause a second packet to be transmitted via the forward MIMO channel, wherein the second packet includes a request to initiate calibration.

14. A tangible, non-transitory computer readable medium or media according to claim 12, wherein the description of the forward MIMO channel is received from the second transceiver device.

15. A tangible, non-transitory computer readable medium or media according to claim 14, wherein the description of the forward MIMO channel corresponds to channel state information received in a second packet.

16. A tangible, non-transitory computer readable medium or media according to claim 14, further storing machine readable instructions that, when executed by the one or more processors, cause the one or more processors to cause a second packet to be transmitted via the forward MIMO channel, wherein
the second packet includes training information for all available spatial dimensions of the forward MIMO channel, and
the second packet is configured to prompt the second transceiver device to transmit the description of the forward MIMO channel to the first transceiver device.

17. A tangible, non-transitory computer readable medium or media according to claim 12, further storing machine readable instructions that, when executed by the one or more processors, cause the one or more processors to determine the partial dimensional description of the reverse MIMO channel without determining a full dimensional description of the reverse MIMO channel.

18. A tangible, non-transitory computer readable medium or media according to claim 12, further storing machine readable instructions that, when executed by the one or more processors, cause the one or more processors to determine the partial dimensional description of the reverse MIMO channel at least by determining a subset of columns of a matrix corresponding to a full-dimensional description of the reverse MIMO channel.

19. A tangible, non-transitory computer readable medium or media according to claim 18, further storing machine readable instructions that, when executed by the one or more processors, cause the one or more processors to develop the correction matrix at least by:
determining a respective correction matrix estimate for each column in the subset of columns of the matrix corresponding to the full-dimensional description of the reverse MIMO channel; and
generating the correction matrix using the respective correction matrix estimates.

20. A tangible, non-transitory computer readable medium or media according to claim 18, further storing machine readable instructions that, when executed by the one or more processors, cause the one or more processors to develop the correction matrix at least by:
- calculating a first singular value decomposition corresponding to the subset of columns of the matrix corresponding to the full-dimensional description of the reverse MIMO channel;
- determining a subset of rows of a matrix corresponding to the description of the forward MIMO channel;
- calculating a second singular value decomposition corresponding to the subset of rows of the matrix corresponding to the description of the forward MIMO channel; and
- generating the correction matrix based on the first singular value decomposition and the second singular value decomposition.

21. A tangible, non-transitory computer readable medium or media according to claim 18, further storing machine readable instructions that, when executed by the one or more processors, cause the one or more processors to develop the correction matrix at least by:
- calculating a first right singular matrix corresponding to the subset of columns of the matrix corresponding to the full-dimensional description of the reverse MIMO channel;
- determining a subset of rows of a matrix corresponding to the description of the forward MIMO channel;
- calculating a second right singular matrix corresponding to the subset of rows of the matrix corresponding to the description of the forward MIMO channel; and
- generating the correction matrix based on the first right singular matrix and the second right singular matrix.

* * * * *